United States Patent
Qu et al.

(10) Patent No.: US 10,110,301 B2
(45) Date of Patent: Oct. 23, 2018

(54) METHOD, APPARATUS, AND SYSTEM FOR DETECTING ROGUE OPTICAL NETWORK UNIT

(71) Applicant: Huawei Technologies Co., Ltd., Shenzhen (CN)

(72) Inventors: Bo Qu, Darmstadt (DE); Baicheng Du, Shenzhen (CN); Dawei Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/622,760

(22) Filed: Jun. 14, 2017

(65) Prior Publication Data
US 2017/0279525 A1 Sep. 28, 2017

Related U.S. Application Data

(63) Continuation of application No. PCT/CN2014/093820, filed on Dec. 15, 2014.

(51) Int. Cl.
*H04B 10/073* (2013.01)
*H04B 10/27* (2013.01)
(Continued)

(52) U.S. Cl.
CPC ........ *H04B 10/0731* (2013.01); *H04B 10/27* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

2012/0163808 A1* 6/2012 Kim ............... H04Q 11/0067
398/30
2014/0029947 A1 1/2014 Wan et al.
(Continued)

FOREIGN PATENT DOCUMENTS

CN 102142894 A 8/2011
CN 102142897 A 8/2011
(Continued)

OTHER PUBLICATIONS

PCT written opinion of the ISA corresponding to PCT/CN2014/093820. dated Sep. 24, 2016 (Year: 2016).*
(Continued)

*Primary Examiner* — Darren E Wolf
(74) *Attorney, Agent, or Firm* — Slater Matsil, LLP

(57) ABSTRACT

Embodiments of the present invention disclose a method. The method includes determining, by an OLT, that an ONU goes offline, and sending to the ONU corresponding to an ONU identifier, a detection message that carries the ONU identifier, where the ONU identifier is an ONU identifier that is occupied before the ONU goes offline and that is not reassigned, and the detection message is used to instruct the ONU corresponding to the ONU identifier to report an identification code. The method also includes receiving, a response message, where the response message carries the identification code of the ONU that sends the response message. The method also includes and determining that the ONU corresponding to the identification code carried in the response message is a rogue ONU.

19 Claims, 5 Drawing Sheets

(51) Int. Cl.
*H04B 10/272* (2013.01)
*H04B 10/40* (2013.01)
*H04B 10/50* (2013.01)
*H04B 10/60* (2013.01)

(56) References Cited

U.S. PATENT DOCUMENTS

| | | | |
|---|---|---|---|
| 2014/0056582 A1* | 2/2014 | Roberts | H04B 10/07955 398/20 |
| 2014/0233940 A1* | 8/2014 | Pitzer | H04B 10/03 398/8 |
| 2014/0294385 A1 | 10/2014 | Khotimsky et al. | |

FOREIGN PATENT DOCUMENTS

| | | |
|---|---|---|
| CN | 103036612 A | 4/2013 |
| CN | 103597759 A | 2/2014 |
| CN | 103997696 A | 8/2014 |
| EP | 2683099 A1 | 1/2014 |

OTHER PUBLICATIONS

International Telecommunication Union, "10-Gigabit-capable passive optical networks (XG—PON): Transmission convergence (TC) layer specification," Series G: Transmission Systems and Media, Digital Systems and Networks, Digital sections and digital line system—Optical line systems for local and access networks, ITU-T G.987.3 (Jan. 2014), 146 pages.

China Telecom Group, "China Telecom EPON Device Technical Requirements (V2.1)," Apr. 2009, 174 pages.

* cited by examiner

METHOD, APPARATUS, AND SYSTEM FOR DETECTING ROGUE OPTICAL NETWORK UNIT

CROSS-REFERENCE TO RELATED APPLICATIONS

This application is a continuation of International Application No. PCT/CN2014/093820, filed on Dec. 15, 2014, the disclosure of which is hereby incorporated by reference in its entirety.

TECHNICAL FIELD

The present invention relates to the communications field, and in particular, to a method, an apparatus, and a system for detecting a rogue optical network unit.

BACKGROUND

In a passive optical network (PON), one central office OLT (optical line terminal) is corresponding to at least one ONU (optical network unit) or ONT (optical network terminal). Because an ONT may be considered as a special ONU, an ONT and an ONU are collectively referred to as an ONU in the following description of this specification.

In a downstream direction, downstream information of an OLT is sent to all ONUs by using a fixed downstream optical wavelength. In an upstream direction, all ONUs emit light in a specific timeslot according to a rule of time division multiplexing of upstream optical path bandwidth, that is, the ONUs emit upstream light according to a bandwidth assignment instruction of the OLT, while a rogue ONU is an ONU that does not emit light according to a bandwidth assignment instruction of the OLT.

There are many types of rogue ONUs. By a light emission time of a rogue ONU, the rogue ONUs may be classified into the following types.

(1) A continuous-mode rogue ONU

Such an ONU emits light at any moment. When an ONU emits light continuously, the ONU occupies all upstream timeslots of an upstream optical wavelength, and consequently, another ONU cannot upload information and a data stream, while in this case, information and a data stream can still be normally delivered in a downstream direction. There are many means for detecting, checking, and isolating such a continuous-mode rogue ONU, and such an ONU is a conventional rogue ONU.

(2) A rogue ONU that advances or delays light emission within a range granted by an OLT Within a time period granted by the OLT, the rogue ONU may advance light emission, delay turn-off, or the like, and consequently affects an "adjacent" ONU. Such a rogue ONU can be effectively processed by using a particular means.

(3) A rogue ONU that irregularly emits light beyond a range granted by an OLT without following a rule Such a rogue ONU emits light at random, and it is extremely difficult to detect, check, and isolate the rogue ONU.

Currently, technologies for detecting, checking, and isolating a rogue ONU are summarized as follows: Interoperability of overall solutions of all manufacturers is poor; it is time-consuming to detect and check some rogue ONUs, a service interruption time is long, and the like. In most of existing rogue ONU detection technologies, whether a rogue ONU exists is determined according to whether light is received at an "idle moment" of an OLT. The "idle moment" may be a dedicated time window that is specially used by the OLT to measure a rogue ONU, or may be an idle moment not granted by the ONU. The OLT determines, according to whether light is received at an idle moment, whether a rogue ONU is connected to the OLT. To ensure detection accuracy, a mechanism of multiple detections and repeated confirmation is generally used. With this method, a continuous-mode rogue ONU and a rogue ONU that advances or delays light emission within a range granted by an OLT can be identified. On the basis of completing identification of a rogue ONU, the rogue ONU is isolated.

In addition, some new types of rogue ONUs have not yet been known. A rogue ONU involved in the present invention is a new type of rogue ONU. When the rogue ONU is faulty, a notification is given on an operational interface that an ONU ID (Identifier, identifier) in a system cannot be used. Currently, this new type of rogue ONU has not yet been widely known in the industry, and there is no relatively effective processing method. In a network with a high split ratio, an operator still needs to spend a relatively long time in manually inserting/removing a fiber on/from an ODN, and then observing a behavior of going online of ONUs on an OLT to check rogue ONUs one by one. Consequently, efficiency is low.

SUMMARY

In view of this, embodiments of the present invention provide a method, an apparatus, and a system for detecting a rogue ONU, so as to detect, check, and isolate a new type of rogue ONU.

According to a first aspect, an embodiment of the present invention provides a method for detecting a rogue optical network unit (ONU). The method includes determining, by an optical line terminal (OLT), that an ONU goes offline. The method also includes sending, by the OLT to the ONU corresponding to an ONU identifier, a detection message that carries the ONU identifier, where the ONU identifier is an ONU identifier that is occupied before the ONU goes offline and that is not reassigned, and the detection message is used to instruct the ONU corresponding to the ONU identifier to report an identification code. The method also includes receiving, by the OLT, a response message, where the response message carries the identification code of the ONU that sends the response message. The method also includes determining, by the OLT, that the ONU corresponding to the identification code carried in the response message is a rogue ONU.

With reference to the implementation manner of the first aspect, in a first possible implementation manner of the first aspect, the OLT sends, to the ONU corresponding to the ONU identifier at a preset time interval, the detection message that carries the ONU identifier; and when determining that the ONU corresponding to the identification code carried in the response message is a rogue ONU, the OLT stops sending the detection message.

With reference to the first aspect or the first possible implementation manner of the first aspect, in a second possible implementation manner of the first aspect, the ONU identifier is an ONU identifier that cannot be normally used in a passive optical network PON.

With reference to any one of the first aspect or the first to the second possible implementation manners of the first aspect, in a third possible implementation manner of the first aspect, after the receiving, by the OLT, a response message, the method further includes: determining, by the OLT, whether an ONU that registers, by using the ONU identifier, for going online exists; and when the ONU that registers, by using the ONU identifier, for going online does not exist, determining, by the OLT, that the ONU corresponding to the identification code carried in the response message is a rogue ONU.

With reference to any one of the first aspect or the first to the third possible implementation manners of the first aspect, in a fourth possible implementation manner of the first aspect, after the determining, by the OLT, that the ONU corresponding to the identification code carried in the response message is a rogue ONU, the method includes: sending, by the OLT, an isolation message to the rogue ONU, where the isolation message is used to instruct the rogue ONU to stop responding to a grant of the OLT.

With reference to any one of the first aspect or the first to the fourth possible implementation manners of the first aspect, in a fifth possible implementation manner of the first aspect, the ONU identifier includes an ONU identifier that is occupied before the ONU goes offline in a periodic sleep mode and/or a periodic doze mode.

With reference to any one of the first aspect or the first to the fifth possible implementation manners of the first aspect, in a sixth possible implementation manner of the first aspect, the identification code includes at least any one of a serial number, a Media Access Control address, a logical link identifier, a logical ONU identifier, or an ONU identifier.

According to a second aspect, an embodiment of the present invention provides a method for detecting a rogue optical network unit (ONU). The method includes, after going offline, receiving, by an ONU and from an optical line terminal (OLT), a detection message that carries an ONU identifier, where the ONU identifier is an ONU identifier that is occupied before the ONU goes offline and that is not reassigned, and the detection message is used to instruct the ONU corresponding to the ONU identifier to report an identification code. The method also includes sending, by the ONU, a response message to the OLT when the ONU stores the ONU identifier, where the response message carries the identification code of the ONU, so that the OLT determines, according to the identification code carried in the response message, that the ONU is a rogue ONU.

With reference to the implementation manner of the second aspect, in a first possible implementation manner of the second aspect, in the ONU, a passive optical network (PON) Media Access Control (MAC) is physically and/or logically separated from a main processor, and the PON MAC is not controlled by the main processor, and sends the response message to the OLT.

With reference to the second aspect or the first possible implementation manner of the second aspect, in a second possible implementation manner of the second aspect, the ONU identifier is an ONU identifier that cannot be normally used in a passive optical network (PON).

With reference to any one of the second aspect or the first to the second possible implementation manners of the second aspect, in a third possible implementation manner of the second aspect, after the OLT determines, according to the identification code carried in the response message, that the ONU is a rogue ONU, the method further includes: receiving, by the ONU, an isolation message from the OLT, where the isolation message is used to instruct the ONU to stop responding to a grant of the OLT.

With reference to any one of the second aspect or the first to the third possible implementation manners of the second aspect, in a fourth possible implementation manner of the second aspect, the ONU identifier includes an ONU identifier that is occupied before the ONU goes offline in a periodic sleep mode and/or a periodic doze mode.

With reference to any one of the second aspect or the first to the fourth possible implementation manners of the second aspect, in a fifth possible implementation manner of the second aspect, the identification code includes at least any one of a serial number, a Media Access Control address, a logical link identifier, a logical ONU identifier, or an ONU identifier.

According to a third aspect, an embodiment of the present invention provides an optical line terminal (OLT). The OLT includes an optical network unit (ONU) status determining module, configured to determine that an ONU goes offline. The OLT also includes a detection message sending module, configured to send, to the ONU corresponding to an ONU identifier, a detection message that carries the ONU identifier, where the ONU identifier is an ONU identifier that is occupied before the ONU goes offline and that is not reassigned, and the detection message is used to instruct the ONU corresponding to the ONU identifier to report an identification code; a response message receiving module, configured to receive a response message, where the response message carries the identification code of the ONU that sends the response message. The OLT also includes a rogue ONU determining module, configured to determine that the ONU corresponding to the identification code carried in the response message is a rogue ONU.

With reference to the implementation manner of the third aspect, in a first possible implementation manner of the third aspect, the detection message sending module is configured to send, to the ONU corresponding to the ONU identifier at a preset time interval, the detection message that carries the ONU identifier, and when it is determined that the ONU corresponding to the identification code carried in the response message is a rogue ONU, stop sending the detection message.

With reference to the third aspect or the first possible implementation manner of the third aspect, in a second possible implementation manner of the third aspect, the ONU identifier is an ONU identifier that cannot be normally used in a passive optical network (PON).

With reference to any one of the third aspect or the first to the second possible implementation manners of the third aspect, in a third possible implementation manner of the third aspect, the rogue ONU determining module is configured to: determine whether an ONU that registers, by using the ONU identifier, for going online exists; and when the ONU that registers, by using the ONU identifier, for going online does not exist, determine that the ONU corresponding to the identification code carried in the response message is a rogue ONU.

With reference to any one of the third aspect or the first to the third possible implementation manners of the third aspect, in a fourth possible implementation manner of the third aspect, the OLT further includes: an isolation message sending module, configured to send an isolation message to the rogue ONU after it is determined that the ONU corresponding to the identification code carried in the response message is a rogue ONU, where the isolation message is used to instruct the rogue ONU to stop responding to a grant of the OLT.

With reference to any one of the third aspect or the first to the fourth possible implementation manners of the third aspect, in a fifth possible implementation manner of the third aspect, the ONU identifier includes an ONU identifier that is occupied before the ONU goes offline in a periodic sleep mode and/or a periodic doze mode.

With reference to any one of the third aspect or the first to the fifth possible implementation manners of the third aspect, in a sixth possible implementation manner of the third aspect, the identification code includes at least any one of a serial number, a Media Access Control address, a logical link identifier, a logical ONU identifier, or an ONU identifier.

According to a fourth aspect, an embodiment of the present invention provides an optical network unit (ONU). The ONU includes: a detection message receiving module, configured to: after the ONU goes offline, receive, from an optical line terminal OLT, a detection message that carries an ONU identifier, where the ONU identifier is an ONU identifier that is occupied before the ONU goes offline and that is not reassigned, and the detection message is used to instruct the ONU corresponding to the ONU identifier to report an identification code. The ONU also includes a response message sending module, configured to send a response message to the OLT when the ONU stores the ONU identifier, where the response message carries the identification code of the ONU, so that the OLT determines, according to the identification code carried in the response message, that the ONU is a rogue ONU.

With reference to the implementation manner of the fourth aspect, in a first possible implementation manner of the fourth aspect, the ONU further includes: a passive optical network PON Media Access Control MAC and a main processor, where the PON MAC is physically and/or logically separated from the main processor, and the PON MAC is not controlled by the main processor, and sends the response message to the OLT.

With reference to the fourth aspect or the first possible implementation manner of the fourth aspect, in a second possible implementation manner of the fourth aspect, the ONU identifier is an ONU identifier that cannot be normally used in a passive optical network (PON).

With reference to any one of the fourth aspect or the first to the second possible implementation manners of the fourth aspect, in a third possible implementation manner of the fourth aspect, the ONU further includes: an isolation message receiving module, configured to receive an isolation message from the OLT after the OLT determines, according to the identification code carried in the response message, that the ONU is a rogue ONU, where the isolation message is used to instruct the ONU to stop responding to a grant of the OLT.

With reference to any one of the fourth aspect or the first to the third possible implementation manners of the fourth aspect, in a fourth possible implementation manner of the fourth aspect, the ONU identifier includes an ONU identifier that is occupied before the ONU goes offline in a periodic sleep mode and/or a periodic doze mode.

With reference to any one of the fourth aspect or the first to the fourth possible implementation manners of the fourth aspect, in a fifth possible implementation manner of the fourth aspect, the identification code includes at least any one of a serial number, a Media Access Control address, a logical link identifier, a logical ONU identifier, or an ONU identifier.

According to a fifth aspect, an embodiment of the present invention provides a system for detecting a rogue optical network unit (ONU). The system includes an optical line terminal (OLT) and an ONU, where the OLT is configured to determine that the ONU goes offline, and send, to the ONU corresponding to an ONU identifier, a detection message that carries the ONU identifier, where the ONU identifier is an ONU identifier that is occupied before the ONU goes offline and that is not reassigned, and the detection message is used to instruct the ONU corresponding to the ONU identifier to report an identification code; the ONU is configured to send a response message to the OLT when the ONU stores the ONU identifier, where the response message carries the identification code of the ONU. The OLT is configured to determine, according to the identification code carried in the response message, that the ONU is a rogue ONU.

With reference to the implementation manner of the fifth aspect, in a first possible implementation manner of the fifth aspect, the OLT is configured to: send, to the ONU corresponding to the ONU identifier at a preset time interval, the detection message that carries the ONU identifier; and when determining that the ONU corresponding to the identification code carried in the response message is a rogue ONU, stop sending the detection message.

With reference to the fifth aspect or the first possible implementation manner of the fifth aspect, in a second possible implementation manner of the fifth aspect, in the ONU, a passive optical network (PON) Media Access Control (MAC) is physically and/or logically separated from a main processor, and the PON MAC is not controlled by the main processor, and sends the response message to the OLT.

With reference to any one of the fifth aspect or the first to the second possible implementation manners of the fifth aspect, in a third possible implementation manner of the fifth aspect, the ONU identifier is an ONU identifier that cannot be normally used in a passive optical network PON.

With reference to any one of the fifth aspect or the first to the third possible implementation manners of the fifth aspect, in a fourth possible implementation manner of the fifth aspect, the OLT is configured to: determine whether an ONU that registers, by using the ONU identifier, for going online exists; and when the ONU that registers, by using the ONU identifier, for going online does not exist, determine that the ONU corresponding to the identification code carried in the response message is a rogue ONU.

With reference to any one of the fifth aspect or the first to the fourth possible implementation manners of the fifth aspect, in a fifth possible implementation manner of the fifth aspect, the OLT is configured to send an isolation message to the rogue ONU after it is determined that the ONU corresponding to the identification code carried in the response message is a rogue ONU, where the isolation message is used to instruct the rogue ONU to stop responding to a grant of the OLT.

With reference to any one of the fifth aspect or the first to the fifth possible implementation manners of the fifth aspect, in a sixth possible implementation manner of the fifth aspect, the ONU identifier includes an ONU identifier that is occupied before the ONU goes offline in a periodic sleep mode and/or a periodic doze mode.

With reference to any one of the fifth aspect or the first to the sixth possible implementation manners of the fifth aspect, in a seventh possible implementation manner of the fifth aspect, the identification code includes at least any one of a serial number, a Media Access Control address, a logical link identifier, a logical ONU identifier, or an ONU identifier.

According to a sixth aspect, an optical line terminal (OLT) is provided. The OLT includes a processor, a memory, a bus, and a communications interface, where the memory is configured to store a computer executable instruction. The processor and the memory are connected by using the bus. When the computer runs, the processor executes the computer executable instruction stored in the memory, so that the computer executes the method according to any one of the first aspect or the possible implementation manners of the first aspect.

According to a seventh aspect, an optical network unit (ONU) is provided, including: a processor, a memory, a bus, and a communications interface, where the memory is configured to store a computer executable instruction. The processor and the memory are connected by using the bus. When the computer runs, the processor executes the computer executable instruction stored in the memory, so that the computer executes the method according to any one of the second aspect or the possible implementation manners of the second aspect.

According to the technical solutions provided in the embodiments of the present invention, an OLT determines that an ONU goes offline, obtains an ONU identifier that is occupied before the ONU goes offline and that is not reassigned, and sends, to the ONU corresponding to the ONU identifier, a detection message that carries the ONU identifier. When the ONU still reserves the ONU identifier after going offline, the ONU feeds back an identification code after receiving the detection message. After the OLT obtains the identification code, a rogue ONU can be quickly positioned and isolated. By means of the technical solutions provided in the embodiments of the present invention, automatic detection and isolation of a new type of rogue ONU are implemented, detection efficiency of the rogue ONU is improved, and impact on a normal service is reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show only some embodiments of the present invention, and persons of ordinary skill in the art may still derive other accompanying drawings or embodiments according to these drawings or description without creative efforts, and the present invention aims to cover all these derived accompanying drawings or embodiments.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are only used to explain the present invention but are not intended to limit the present invention. Apparently, the described embodiments are only some but not all of the embodiments of the present invention. All other embodiments obtained by persons of ordinary skill in the art based on the embodiments of the present invention without creative efforts shall fall within the protection scope of the present invention.

Embodiment 1

A PON technology is a point-to-multipoint (P2MP) optical access technology. A PON system includes an OLT, a passive optical splitter (POS), an ONU, and a fiber. In the system, any two points (the OLT and a POS, two levels of POSs, or a POS and an ONU) are connected by using a fiber.

Figure 1:
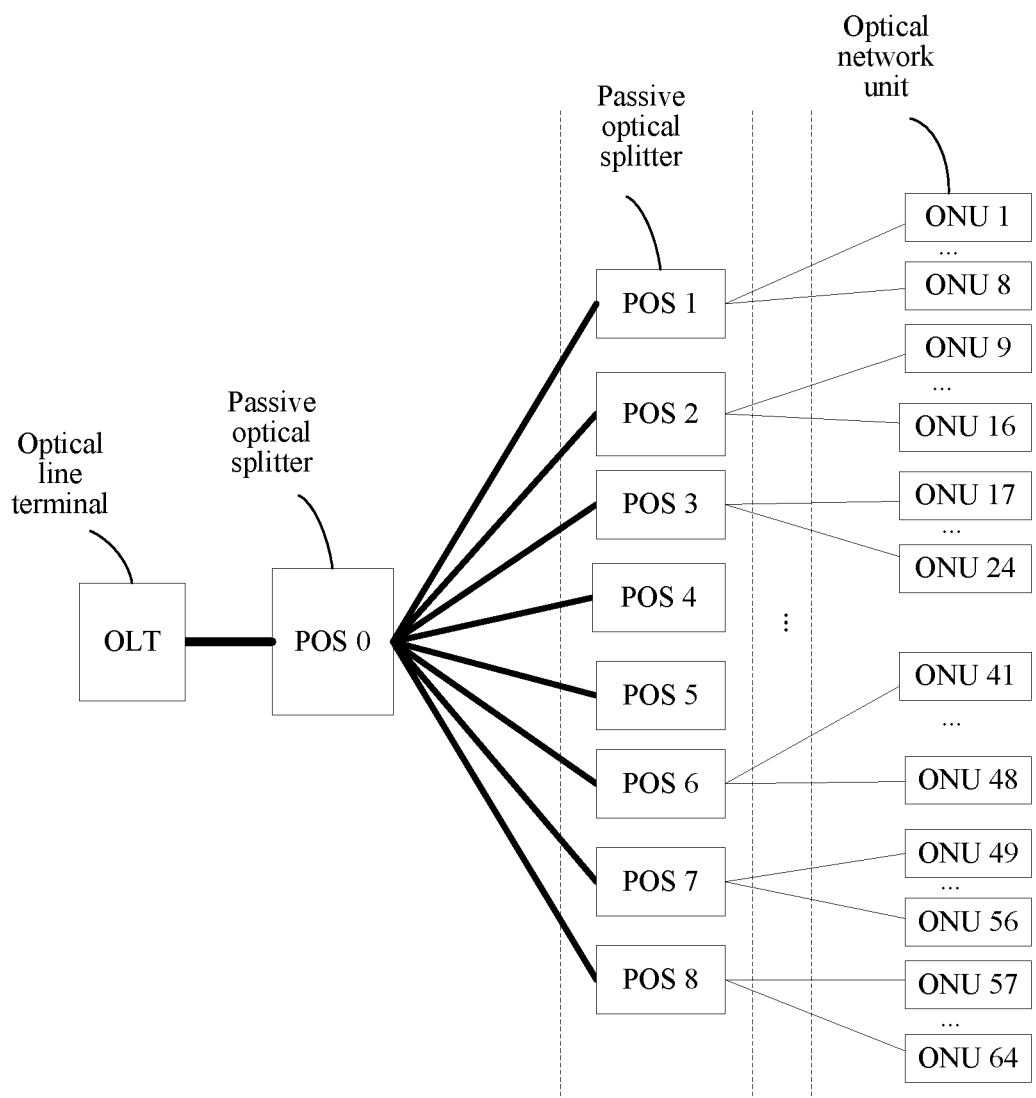
FIG. 1 is a schematic diagram of a network architecture of a PON.

As shown in FIG. 1, if an exception occurs in an ONU 41 connected to a level 2 splitter of an OLT, such as a software crash or a software exception, or an exception of a module that is used for registering for going online and that is of software of the ONU 41, the symptom is shown as follows: The OLT considers that the ONU 41 goes offline, but the ONU 41 still reserves information such as an ONU ID of 25 (the ONU ID of 25 is used as an example), and can continuously respond to a downstream dynamic bandwidth assignment (DBA) grant that is of an OLT and that is specific to the ONU ID of 25. In this case, the ONU 41 becomes a rogue ONU. If the ONU 41 is in an abnormal state and cannot automatically recover from a fault, when an ONU 16 that is in a normal state and that is connected to the OLT attempts to register, by using the ONU ID of 25, for going online under the OLT, the ONU 16 cannot register for going online because of impact of the ONU 41. When the OLT assigns bandwidth to an ONU whose ONU ID is 25, in a time sequence for an ONU ID of 25, the OLT receives packets sent by the both ONU 41 and the ONU 16, and the two light beams "collide" in the same time sequence, and consequently, upstream frames/packets cannot be normally delimited by the OLT. On the OLT and upper-layer network management, the symptom is shown as follows: On a port of the OLT, a particular ONU ID cannot be used, and an ONU in a normal state cannot normally register, by using the ONU ID, for going online. Because the ONU 41 affects only a specific ONU ID, the ONU 41 is referred to as a Special ONU ID's Rogue ONU (SID-RONU). The ONU is a rogue ONU that affects a specific ONU ID, and is a new type of rogue ONU. Currently, it is extremely difficult to check such a rogue ONU, and the check needs to be performed by inserting and removing fibers one by one on an ODN, and then observing a behavior of going online of an ONU on an OLT.

Figure 2:
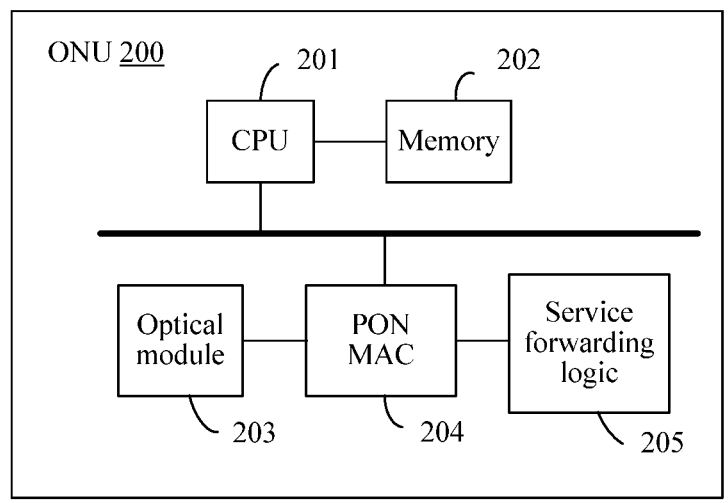
FIG. 2 is a schematic diagram of a logical structure of an ONU.

As shown in FIG. 2, an ONU 200 includes a central processing unit (CPU) 201, a memory 202, an optical module 203, a PON MAC 204, and a service forwarding logic 205. The CPU 201 controls the PON MAC 204 and the service forwarding logic 205 by running program code stored in the memory 202. The optical module 203 is configured to receive or send an optical signal. The PON MAC 204 refers to an apparatus that can process protocols of PONs such as a Gigabit-Capable Passive Optical Network (GPON), an XGPON, an Ethernet Passive Optical Network (EPON), and a 10GEPON. The GPON is used as an example. The PON MAC 204 can process layer data of a Physical Medium Dependent (PMD) layer and a transmission convergence (TC) layer in the GPON protocol, generally by using an application-specific integrated circuit (ASCI) chip. The forwarding logic 205 is configured to perform forwarding processing on a layer 2 service.

A precondition for this embodiment of the present invention is as follows. The PON MAC in the ONU is separated from upper-layer software of the ONU, that is, the PON MAC is not controlled by the CPU and works independently. If an exception occurs in the upper-layer software of the ONU, the PON MAC can respond to a DBA grant of an OLT, capture a packet, parse the packet, and send a response packet.

In this embodiment of the present invention, an OLT performs a DBA grant specific to an ONU ID that is occupied before an ONU goes offline and that is not reassigned. When at least one ONU ID that is occupied before the ONU goes offline and that is not reassigned exists, grants may be performed for ONU IDs one by one, and a detection message is sent to an ONU corresponding to each ONU ID for at least once at a preset time interval. If an SID-RONU exists, after receiving a detection message, the SID-RONU sends, in a time sequence of a DBA grant, a response message that carries an identification code. The OLT obtains the identification code of the ONU from the response message, and because the identification code can uniquely identify identification information of the ONU, the OLT can determine that the ONU corresponding to the obtained identification code of the ONU is a rogue ONU. In this case, the OLT delivers an isolation message to the rogue ONU, and instructs the rogue ONU to be isolated automatically, or may accurately know a specific location of the rogue ONU according to the identification code of the rogue ONU, so as to manually check the rogue ONU. Specifically, the identification code of the ONU may be configured by a system, or may be a product code of an optical module, and may specifically include but is not limited to a combination of at least any one of an serial number (SN), a Media Access Control (MAC) address, a Logical Link Identifier (LLID), a Logical ONU Identifier (LOID), or an ONU Identifier (ONU ID).

Embodiment 2

Figure 3:
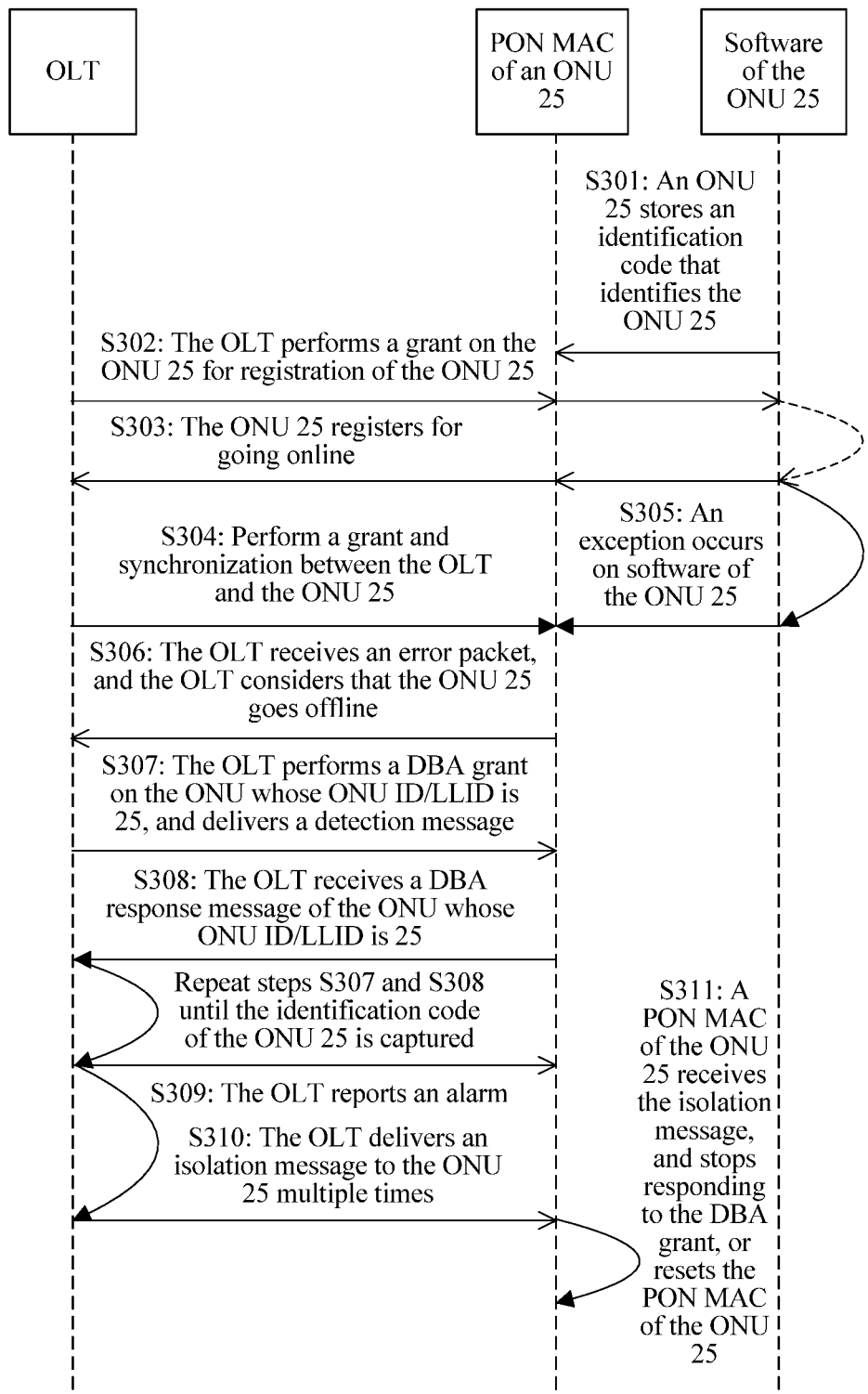
FIG. 3 is a signaling interaction diagram of a method for detecting a rogue ONU according to an embodiment of the present invention.

FIG. 3 is a signaling interaction diagram of a method for detecting a rogue ONU according to an embodiment of the present invention. As shown in FIG. 3, an ONU ID/LLID of 25 is used as an example, and an ONU that goes online by using the ONU ID/LLID of 25 is defined as an ONU 25.

S301: The ONU 25 stores an identification code that identifies the ONU 25.

After the ONU 25 is powered on and started, a PON MAC of the ONU 25 obtains, from software of the ONU 25, the identification code that identifies the ONU 25, and stores the identification code. The identification code of the ONU 25 includes but is not limited to a combination of at least any one of an SN, a MAC address, an LLID, an LOID, or an ONU ID. The SN is written in a chip before delivery, and the serial number is globally unique. The MAC address is used in a standard to define a location of a network device, and the MAC address is globally unique. The LLID is a type of numeral identifier that is assigned by an EPON system to a logical link, and each logical link is assigned a unique LLID. The LOID is used to identify information such as a location of an ONU, to facilitate operation and maintenance. The ONU ID is defined in an ITU Telecommunication Standardization Sector (ITU-T) GPON/XGPON standard, is assigned to a registered ONU by an OLT, and is used to identify a specific ONU. When no SID-RONU exists, identification codes of all ONUs that are connected to a same OLT are different from one another, so as to distinguish between all the ONUs.

S302: The OLT performs a grant on the ONU 25 for registration of the ONU 25.

The ONU registers for going online with the grant of the OLT. For example, in the EPON system, a Multi-Point Control Protocol (MPCP) process is completed between the OLT and the ONU, and an Operation, Administration and Maintenance (OAM) extended discovery process is entered.

S303: The ONU 25 registers for going online.

With the grant of the OLT, the ONU 25 successfully registers for going online.

S304: Perform a grant and synchronization between the OLT and the ONU 25.

Specifically, the OLT performs a DBA grant and management on the ONU 25 by using information such as an ONU ID/LLID of 25.

S305: An exception occurs in software of the ONU 25.

An exception occurs in the ONU 25 in some cases, for example, the ONU cannot be reset or upper-layer software is "hung up". "Hanging up" of the software refers to a software crash or a software exception. When a software system is "hung up", the following symptoms occur: Scheduling of processes, tasks, or the like in the software system is abnormal, some functions of the software system cannot be used, and the system does not respond to an external service and request within a long period of time. If the PON MAC of the ONU 25 still reserves information such as an ONU ID/LLID of 25, and can respond to the DBA grant that is of the OLT and that is specific to the ONU ID/LLID of 25, in this case, the ONU 25 indicates an SID-RONU.

S306: The OLT receives an error packet, and the OLT considers that the ONU 25 goes offline.

Because an exception occurs in the ONU 25, the OLT receives an error packet of the ONU 25, detects, by using a synchronization mechanism in an existing standard, that the ONU goes offline, and sets the ONU 25 to an offline state.

S307: The OLT performs a DBA grant on the ONU whose ONU ID/LLID is 25, and delivers a detection message.

The OLT performs a DBA grant specific to one or more ONU IDs that are occupied before the ONU goes offline and that are not reassigned, and sends a detection message. The ONU ID of 25 is used only as an example in this embodiment. In this case, the OLT cannot determine whether the ONU 25 normally goes offline, that is, whether the ONU 25 is an SID-RONU, and needs to further detect and determine whether the ONU 25 becomes an SID-RONU. Because the ONU 25 goes online by using information such as an ONU ID/LLID of 25, and this is recorded on the OLT, the OLT may perform the DBA grant specific to the ONU ID/LLID that is occupied before the ONU goes offline and that is not reassigned, for example, the ONU whose ONU ID/LLID is 25, and deliver the detection message.

In a GPON, the detection message that is sent by the OLT to the ONU 25 may be an extended Physical Layer Operations, Administration and Maintenance (PLOAM) message, and an extension field of the PLOAM message is used to indicate that the message is an SID-RONU detection message. A value of the extension field is user-defined.

In an EPON, the detection message that is sent by the OLT to the ONU 25 may be an extended OAM message. Specifically, an extended operation code in the message indicates that the message is an Extended Variable Request message that is sent by the OLT to the ONU. A branch field and a leaf field in the OAM message indicate that an attribute of the message is private extension. An extended query code field in the OAM message indicates that the message is an SID-RONU detection message. For example, when a value of a query code is set to a non-zero integer, the message is used to query an identification code of an SID-RONU. Optionally, the message further carries a byte length of the extended query code field.

S308: The OLT receives a DBA response message of the ONU whose ONU ID/LLID is 25, and captures the identification code of the ONU.

After the ONU 25 receives the detection message, if the ONU 25 is an SID-RONU, the PON MAC of the ONU 25 sends the identification code of the ONU 25 in a time sequence of a DBA grant of the OLT. After receiving the DBA response message of the ONU 25, the OLT can determine that an SID-RONU exists in the system and attempts to capture an identification code of the SID-RONU. In a specific implementation process, one or more of other ONUs may become SID-RONUs, and only the ONU 25 is used as an example herein.

In the GPON, the OLT may receive the response message of the ONU by using an extended PLOAM message. Specifically, the PLOAM message may carry the identification code of the ONU by using an extension field, and the identification code includes but is not limited to an ONU ID, an SN, a MAC address, an LOID, and an LLID. The message further carries a cyclic redundancy check (CRC) code to perform check on content of a packet.

In the EPON, the OLT may receive the response message of the ONU by using an extended OAM message. Specifically, an extended operation code in the message indicates that the message is an Extended Variable Response message that is sent by the ONU to the OLT. A branch field and a leaf field in the OAM message indicate that an attribute of the message is private extension. In addition, in the response message, a value of the branch field and a value of the leaf field are consistent with those in the SID-RONU detection message. This indicates that the message is a response message specific to the SID-RONU detection message. Similarly, the OAM message carries the identification code of the ONU by using an extension field, and the identification code includes but is not limited to an ONU ID, an SN, a MAC address, an LOID, and an LLID. Optionally, the message further carries a byte length of the extension field.

Steps S307 and S308 are repeated until the identification code of the ONU 25 is captured.

In this case, if another ONU attempts to go online by using the ONU ID/LLID of 25, between the OLT and the ONU, upstream light may overlap in a time sequence for an ONU ID/LLID of 25, and it cannot be ensured that the OLT can capture the identification code of the ONU 25 each time a DBA response message of the ONU 25 is received. The OLT needs to deliver a detection message multiple times until a DBA response message that carries the identification code of the ONU 25 is received.

S309: The OLT reports an alarm.

After capturing the identification code of the ONU 25, the OLT reports the alarm, to notify a network administrator that an SID-RONU fault occurs in the system.

S310: The OLT delivers an isolation message to the ONU 25.

After obtaining the identification code of the ONU 25, the OLT determines that the ONU 25 is an SID-RONU, and delivers the isolation message to the ONU 25. Alternatively, after obtaining the identification code of the ONU 25, the OLT determines a specific location of the ONU 25, so as to manually check the ONU 25.

S311: The ONU 25 receives the isolation message, and stops responding to the DBA grant, or resets a PON MAC of the ONU 25.

After receiving the isolation message, the ONU 25 immediately stops responding to the DBA grant specific to the ONU whose ONU ID/LLID is 25, and attempts to recover to a normal state, such as resetting the PON MAC.

In this embodiment, an OLT performs a DBA grant specific to an ONU identifier that is occupied before an ONU goes offline and that is not reassigned, sends a detection message, obtains an identification code of the ONU from a response message of the ONU, and determines that the ONU corresponding to the identification code of the ONU is a rogue ONU, thereby effectively resolving a fault problem of an SID-RONU, implementing automatic detection and isolation of the SID-RONU, improving detection efficiency, and reducing impact on a normal service.

Embodiment 3

Figure 4:
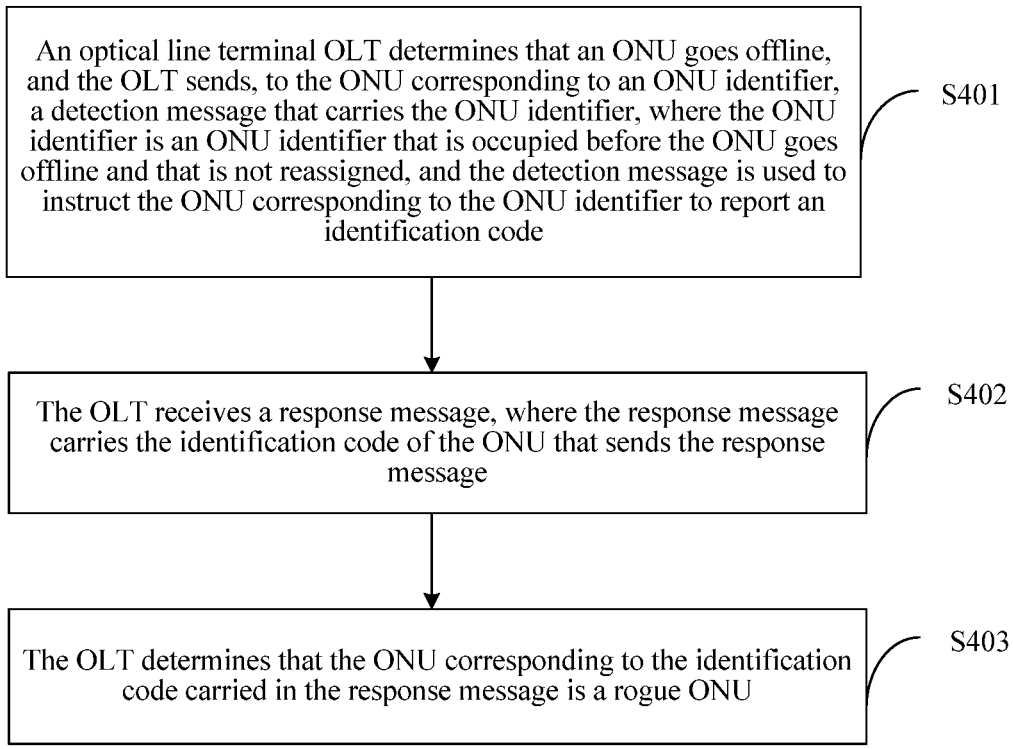
FIG. 4 is a flowchart of an example of implementation of a method for detecting a rogue ONU according to an embodiment of the present invention.

FIG. 4 is a flowchart of an example of a method for detecting a rogue ONU according to an embodiment of the present invention. In a specific implementation process, the method may be executed by an optical line terminal (OLT), and includes the following steps.

S401: The optical line terminal (OLT) determines that an ONU goes offline, and the OLT sends, to the ONU corresponding to an ONU identifier, a detection message that carries the ONU identifier, where the ONU identifier is an ONU identifier that is occupied before the ONU goes offline and that is not reassigned, and the detection message is used to instruct the ONU corresponding to the ONU identifier to report an identification code.

When the ONU is in a normal online state, if a case such as a software exception or a software crash occurs, the OLT receives an error packet, and considers that the ONU goes offline. In this case, the ONU may still not release information such as the ONU ID of the ONU, and consequently, the ONU becomes an SID-RONU. In this case, the OLT sets the ONU to an offline state, but cannot determine whether the ONU normally goes offline or whether the ONU becomes an SID-RONU. Therefore, after determining that the ONU goes offline, the OLT sends, to the ONU corresponding to the ONU identifier, the detection message that carries the ONU identifier, so as to instruct the ONU corresponding to the ONU identifier to report the identification code. Specifically, the detection message is a non-broadcast message, and the ONU identifier carried in the detection message is an ONU identifier that is occupied before the ONU goes offline and that is not reassigned. The ONU corresponding to the ONU identifier is specifically an ONU that goes online by using the ONU identifier before going offline.

Specifically, the normal online state of the ONU includes an energy conservation mode, which specifically includes a periodic sleep mode and a periodic doze mode.

Optionally, when an ONU identifier cannot be normally used in a passive optical network, the OLT may send, to an ONU corresponding to the ONU identifier, a detection message that carries the ONU identifier, so as to instruct the ONU corresponding to the ONU identifier to report an identification code. The ONU identifier carried in the detection message is an ONU identifier that cannot be normally used, and specifically, the ONU identifier cannot be assigned to an ONU that normally registers for going online.

Specifically, the identification code of the ONU includes but is not limited to any one or more of an ONU ID, an SN, a MAC address, an LOID, or an LLID.

S402: The OLT receives a response message, where the response message carries the identification code of the ONU that sends the response message.

Optionally, it cannot be ensured that each time the response message is received, the OLT can successfully obtain the identification code of the ONU that sends the response message. Therefore, the OLT sends a detection message to the ONU for at least once at a preset time interval, that is, the OLT may periodically send the detection message. When obtaining, from the response message, the identification code of the ONU that is carried in the response message, the OLT stops sending the detection message.

S403: The OLT determines that the ONU corresponding to the identification code carried in the response message is a rogue ONU.

In a specific implementation process, one or more ONUs may become SID-RONUs. Therefore, an identification code of each SID-RONU needs to be obtained, and each SID-RONU needs to be checked and isolated. When the OLT receives a response message or response messages of one or more SID-RONUs, each response message carries an identification code of an ONU that sends the response message.

In a specific implementation process, when an ONU ID that is occupied before an ONU goes offline and that is not reassigned is used by an ONU that attempts to register for going online and is reserved by an SID-RONU, in this case, the OLT sends a detection message that carries the ONU ID, and the OLT may receive a response message that carries an identification code and that is sent by the ONU that attempts to register for going online and a response message that carries an identification code and that is sent by the SID-RONU. In this case, the OLT cannot accurately determine which ONU is the SID-RONU. Optionally, after receiving the response message, the OLT further needs to determine whether an ONU that registers, by using the ONU identifier carried in the detection message, for going online exists; when the ONU that registers, by using the ONU identifier carried in the detection message, for going online does not exist, the OLT determines that the ONU corresponding to the identification code carried in the response message is a rogue ONU.

Optionally, after determining that the ONU corresponding to the identification code of the ONU that is carried in the response message is a rogue ONU, the OLT delivers an isolation message to the corresponding rogue ONU, so that the rogue ONU stops responding to a grant of the OLT; or the OLT may determine a specific location of a rogue ONU by using the identification code of the ONU, so as to perform manual check.

In this embodiment, an OLT sends a detection message that carries an ONU identifier that is occupied before an ONU goes offline and that is not reassigned, obtains an identification code of the ONU from a received response message, and determines that the ONU corresponding to the identification code of the ONU is a rogue ONU, thereby implementing automatic detection and isolation of an SID-RONU, improving detection efficiency, and reducing impact on a normal service.

Embodiment 4

Figure 5:
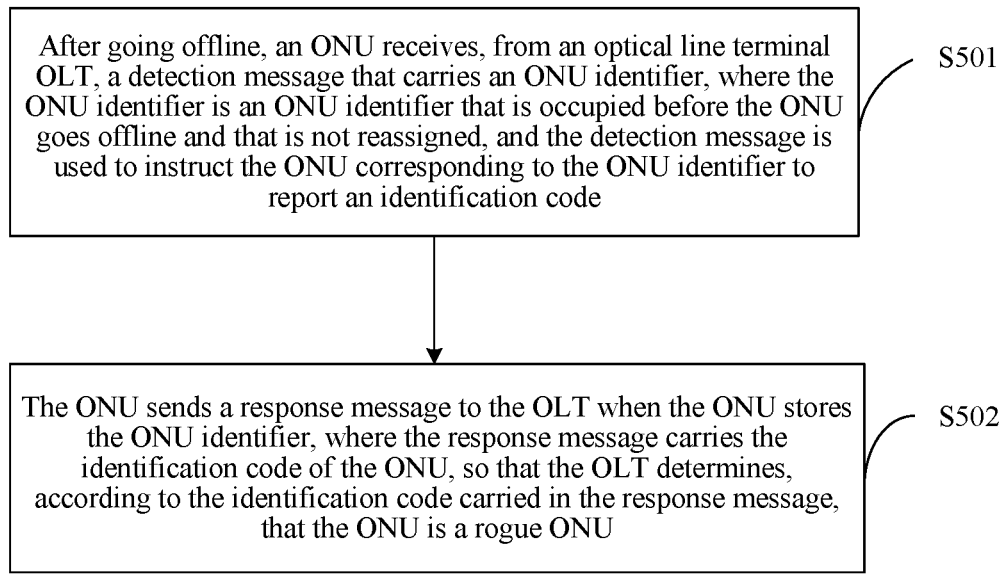
FIG. 5 is a flowchart of an example of implementation of a method for detecting a rogue ONU according to an embodiment of the present invention.

FIG. 5 is a flowchart of an example of a method for detecting a rogue ONU according to an embodiment of the present invention. The method may be executed by an optical network unit (ONU), and includes the following steps.

S501: After going offline, the ONU receives, from an optical line terminal OLT, a detection message that carries an ONU identifier, where the ONU identifier is an ONU identifier that is occupied before the ONU goes offline and that is not reassigned, and the detection message is used to instruct the ONU corresponding to the ONU identifier to report an identification code.

In a specific implementation process, when the ONU is in a normal online state, a case such as a software exception or a software crash occurs, and consequently, the OLT considers that the ONU goes offline, but the ONU still reserves and does not release the ONU ID. Therefore, the ONU can still respond to a DBA grant that is of the OLT and that is specific to the ONU ID reserved by the ONU, and receive the detection message that carries the ONU identifier, where the ONU identifier carried in the detection message is an ONU identifier that is occupied before the ONU goes offline and that is not reassigned.

Specifically, the normal online state of the ONU includes an energy conservation mode, which specifically includes a periodic sleep mode and a periodic doze mode.

Optionally, when an ONU identifier cannot be normally used in a passive optical network, an ONU corresponding to the ONU identifier may receive a detection message from the OLT, so as to instruct the ONU corresponding to the ONU identifier to report an identification code. The ONU identifier carried in the detection message is an ONU identifier that cannot be normally used, and specifically, the ONU identifier cannot be assigned to an ONU that normally registers for going online.

Specifically, the identification code includes but is not limited to any one or more of an ONU ID, an SN, a MAC address, an LOID, or an LLID.

S502: The ONU sends a response message to the OLT when the ONU stores the ONU identifier, where the response message carries the identification code of the ONU, so that the OLT determines, according to the identification code carried in the response message, that the ONU is a rogue ONU.

In a specific implementation process, in the ONU, a PON MAC is physically separated from a main processor, and the PON MAC can work independently. Even if an exception or a crash occurs in upper-layer software of the ONU, the PON MAC can send the response message that carries the identification code of the ONU.

Optionally, after it is determined that the ONU is a rogue ONU, the ONU further receives an isolation message from the OLT, and stops responding to a grant of the OLT, or the ONU further attempts to recover to a normal state, for example, performing a resetting operation.

In this embodiment, after receiving a detection message of an OLT, an ONU reports an identification code to the OLT, so that the OLT determines that the ONU is a rogue ONU, thereby implementing automatic detection and isolation of an SID-RONU, improving detection efficiency, and reducing impact on a normal service.

Embodiment 5

Figure 6:
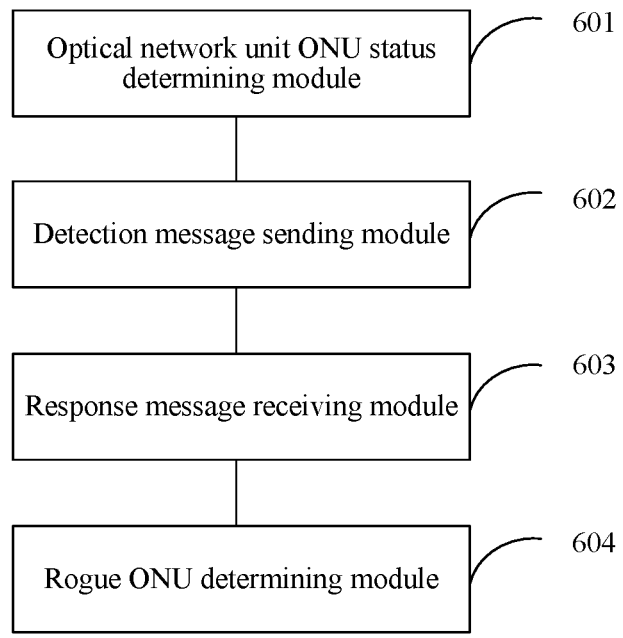
FIG. 6 is a schematic diagram of a logical structure of implementation of an optical line terminal OLT according to an embodiment of the present invention.

FIG. 6 is a schematic diagram of a logical structure of an optical line terminal OLT according to an embodiment of the present invention. As shown in FIG. 6, the OLT includes: an optical network unit ONU status determining module 601, configured to determine that an ONU goes offline; a detection message sending module 602, configured to send, to the ONU corresponding to an ONU identifier, a detection message that carries the ONU identifier, where the ONU identifier is an ONU identifier that is occupied before the ONU goes offline and that is not reassigned, and the detection message is used to instruct the ONU corresponding to the ONU identifier to report an identification code; a response message receiving module 603, configured to receive a response message, where the response message carries the identification code of the ONU that sends the response message; and a rogue ONU determining module 604, configured to determine that the ONU corresponding to the identification code carried in the response message is a rogue ONU.

Optionally, the OLT may further include an isolation message sending module, configured to send an isolation message to the rogue ONU after it is determined that the ONU corresponding to the identification code carried in the response message is a rogue ONU, where the isolation message is used to instruct the rogue ONU to stop responding to a grant of the OLT.

In this embodiment, an OLT sends a detection message that carries an ONU identifier that is occupied before an ONU goes offline and that is not reassigned, obtains an identification code of the ONU from a received response message, and determines that the ONU corresponding to the identification code of the ONU is a rogue ONU, thereby implementing automatic detection and isolation of an SID-RONU, improving detection efficiency, and reducing impact on a normal service.

Embodiment 6

Figure 7:
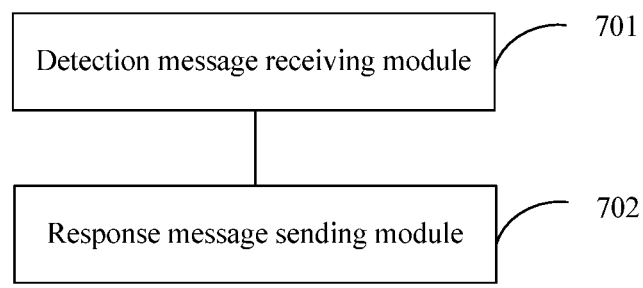
FIG. 7 is a schematic diagram of a logical structure of implementation of an optical network unit ONU according to an embodiment of the present invention.

FIG. 7 is a schematic diagram of a logical structure of an optical network unit ONU according to an embodiment of the present invention. As shown in FIG. 7, the ONU includes: a detection message receiving module 701, configured to: after the ONU goes offline, receive, from an optical line terminal OLT, a detection message that carries an ONU identifier, where the ONU identifier is an ONU identifier that is occupied before the ONU goes offline and that is not reassigned, and the detection message is used to instruct the ONU corresponding to the ONU identifier to report an identification code; and a response message sending module 702, configured to send a response message to the OLT when the ONU stores the ONU identifier, where the response message carries the identification code of the ONU, so that the OLT determines, according to the identification code carried in the response message, that the ONU is a rogue ONU.

Optionally, the ONU further includes an isolation message receiving module, configured to receive an isolation message from the OLT after the OLT determines that the ONU corresponding to the identification code carried in the response message is a rogue ONU, where the isolation message is used to instruct the rogue ONU to stop responding to a grant of the OLT.

In this embodiment, after receiving a detection message of an OLT, an ONU reports an identification code to the OLT, so that the OLT determines that the ONU is a rogue ONU, thereby implementing automatic detection and isolation of an SID-RONU, improving detection efficiency, and reducing impact on a normal service.

Embodiment 7

Figure 8:
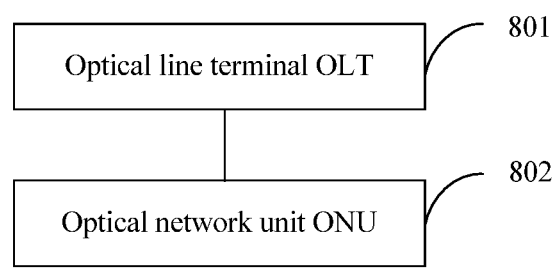
FIG. 8 is a schematic diagram of a logical structure of implementation of a system for detecting a rogue ONU according to an embodiment of the present invention.

FIG. 8 is a schematic diagram of a logical structure of a system for detecting a rogue ONU according to an embodiment of the present invention. As shown in FIG. 8, the system includes an optical line terminal OLT 801 and an optical network unit ONU 802.

The OLT 801 is configured to determine that the ONU 802 goes offline, and send, to the ONU 802 corresponding to an ONU identifier, a detection message that carries the ONU identifier, where the ONU identifier is an ONU identifier that is occupied before the ONU goes offline and that is not reassigned, and the detection message is used to instruct the ONU 802 corresponding to the ONU identifier to report an identification code.

The ONU 802 is configured to send a response message to the OLT 801 when the ONU 802 stores the ONU identifier, where the response message carries the identification code of the ONU 802.

The OLT 801 is configured to determine, according to the identification code carried in the response message, that the ONU 802 is a rogue ONU.

In the embodiments of the present invention, the GPON protocol and the EPON protocol are used only as an example for description, but PON protocols are not limited thereto; with the evolution of a network, the technical solutions of the present invention may also be used in other types of protocols in the network. Alternatively, in the embodiments of the present invention, detection of a fault of an SID-RONU may be implemented without following a standard protocol. Therefore, the protection scope of the present invention is not limited by a specific message format.

Persons of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

The foregoing descriptions are only specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

The foregoing are only several embodiments of the present invention. Persons skilled in the art may make various modifications and variations to the present invention without departing from the spirit and scope of the present invention.

What is claimed is:
1. A method, comprising:
 determining, by an optical line terminal (OLT), that an optical network unit (ONU) goes offline, and sending, by the OLT to the ONU corresponding to an ONU identifier, a detection message that carries the ONU identifier, wherein the ONU identifier is occupied before the ONU goes offline and is not reassigned, and the detection message instructs the ONU corresponding to the ONU identifier to report an identification code;
 receiving, by the OLT, a response message, wherein the response message carries the identification code of the ONU that sends the response message; and determining, by the OLT, that the ONU corresponding to the identification code carried in the response message is a rogue ONU.

2. The method according to claim 1, wherein the OLT sends, to the ONU corresponding to the ONU identifier at a preset time interval, the detection message that carries the ONU identifier; and when determining that the ONU corresponding to the identification code carried in the response message is a rogue ONU, the OLT stops sending the detection message.

3. The method according to claim 1, wherein after receiving, by the OLT, the response message, the method further comprises:
determining, by the OLT, whether an ONU that registers, by using the ONU identifier, for going online exists; and
when the ONU that registers, by using the ONU identifier, for going online does not exist, determining, by the OLT, that the ONU corresponding to the identification code carried in the response message is a rogue ONU.

4. The method according to claim 1, wherein the ONU identifier comprises an ONU identifier that is occupied before the ONU goes offline in a periodic sleep mode and/or a periodic doze mode.

5. A method, comprising:
after going offline, receiving, by an optical network unit (ONU) from an optical line terminal (OLT), a detection message that carries an ONU identifier, wherein the ONU identifier is an ONU identifier that is occupied before the ONU goes offline and that is not reassigned, and the detection message instructs the ONU corresponding to the ONU identifier to report an identification code; and
sending, by the ONU, a response message to the OLT when the ONU stores the ONU identifier, wherein the response message carries the identification code of the ONU, so that the OLT determines, according to the identification code carried in the response message, that the ONU is a rogue ONU.

6. The method according to claim 5, wherein after the OLT determines, according to the identification code carried in the response message, that the ONU is a rogue ONU, the method further comprises:
receiving, by the ONU, an isolation message from the OLT, wherein the isolation message instructs the ONU to stop responding to a grant of the OLT.

7. The method according to claim 5, wherein the ONU identifier comprises an ONU identifier that is occupied before the ONU goes offline in a periodic sleep mode and/or a periodic doze mode.

8. An optical line terminal (OLT), comprising:
a processor; and
a computer-readable storage medium storing a program to be executed by the processor, the program including instructions for determining that an ONU goes offline; and
a transmitter, configured to send, to the ONU corresponding to an ONU identifier, a detection message that carries the ONU identifier, wherein the ONU identifier is an ONU identifier that is occupied before the ONU goes offline and that is not reassigned, and the detection message instructs the ONU corresponding to the ONU identifier to report an identification code; and
a receiver, configured to receive a response message, wherein the response message carries the identification code of the ONU that sends the response message;
wherein the program further includes instructions for determining that the ONU corresponding to the identification code carried in the response message is a rogue ONU.

9. The OLT according to claim 8, wherein: the transmitter is configured to send, to the ONU corresponding to the ONU identifier at a preset time interval, the detection message that carries the ONU identifier, and when the ONU corresponding to the identification code carried in the response message is a rogue ONU, stop sending the detection message.

10. The OLT according to claim 8, wherein the program further includes instructions for determining whether an ONU that registers, by using the ONU identifier, for going online exists; and when the ONU that registers, by using the ONU identifier, for going online does not exist, determine that the ONU corresponding to the identification code carried in the response message is a rogue ONU.

11. The OLT according to claim 8, wherein the ONU identifier comprises an ONU identifier that is occupied before the ONU goes offline in a periodic sleep mode and/or a periodic doze mode.

12. An optical network unit (ONU), comprising:
a receiver, configured to, after the ONU goes offline, receive, from an optical line terminal (OLT), a detection message that carries an ONU identifier, wherein the ONU identifier is an ONU identifier that is occupied before the ONU goes offline and that is not reassigned, and the detection message instructs the ONU corresponding to the ONU identifier to report an identification code; and
a transmitter, configured to send a response message to the OLT when the ONU stores the ONU identifier, wherein the response message carries the identification code of the ONU, so that the OLT determines, according to the identification code carried in the response message, that the ONU is a rogue ONU.

13. The ONU according to claim 12, wherein the receiver is further configured to receive an isolation message from the OLT after the OLT determines, according to the identification code carried in the response message, that the ONU is a rogue ONU, wherein the isolation message instructs the ONU to stop responding to a grant of the OLT.

14. The ONU according to claim 12, wherein the ONU identifier comprises an ONU identifier that is occupied before the ONU goes offline in a periodic sleep mode and/or a periodic doze mode.

15. A system, comprising:
an optical line terminal (OLT); and
an optical network unit (ONU);
wherein the OLT is configured to determine that the ONU goes offline, and send, to the ONU corresponding to an ONU identifier, a detection message that carries the ONU identifier, wherein the ONU identifier is an ONU identifier that is occupied before the ONU goes offline and that is not reassigned, and the detection message instructs the ONU corresponding to the ONU identifier to report an identification code;
wherein the ONU is configured to send a response message to the OLT when the ONU stores the ONU identifier, wherein the response message carries the identification code of the ONU; and
wherein the OLT is configured to determine, according to the identification code carried in the response message, that the ONU is a rogue ONU.

16. The system according to claim 15, wherein the OLT is further configured to:

send, to the ONU corresponding to the ONU identifier at a preset time interval, the detection message that carries the ONU identifier; and when determining that the ONU corresponding to the identification code carried in the response message is a rogue ONU, stop sending the detection message.

17. The system according to claim 15, wherein in the ONU, a passive optical network (PON) Media Access Control (MAC) is physically and/or logically separated from a main processor, and the PON MAC is not controlled by the main processor, and sends the response message to the OLT.

18. The system according to claim 15, wherein the ONU identifier is an ONU identifier that cannot be normally used in a passive optical network (PON).

19. The system according to claim 15, wherein the OLT is further configured to:

determine whether an ONU that registers, by using the ONU identifier, for going online exists; and when the ONU that registers, by using the ONU identifier, for going online does not exist, determine that the ONU corresponding to the identification code carried in the response message is a rogue ONU.

* * * * *